United States Patent [19]

Burrus

[11] Patent Number: 5,224,270
[45] Date of Patent: Jul. 6, 1993

[54] VISUAL HITCH ALIGNMENT APPARATUS

[76] Inventor: Thomas L. Burrus, 8321 SW. 39 Ct., Davie, Fla. 33328

[21] Appl. No.: 805,157

[22] Filed: Dec. 11, 1991

[51] Int. Cl.⁵ .................. G01B 11/27; B60D 1/36
[52] U.S. Cl. .................... 33/264; 356/399; 280/477
[58] Field of Search ........... 356/3, 18, 399; 33/264, 33/286; 116/28 R; 280/477

[56] References Cited

U.S. PATENT DOCUMENTS

| | | | |
|---|---|---|---|
| 2,984,011 | 5/1961 | Hamilton | 116/28 R |
| 4,257,706 | 3/1981 | Smith | 356/3 |
| 4,687,220 | 8/1987 | Danielson | 33/364 X |
| 4,813,758 | 3/1989 | Sanders | 33/364 X |
| 4,890,918 | 1/1990 | Monford | 356/399 |
| 4,941,263 | 7/1990 | Hirshberg | 33/364 |
| 5,113,588 | 5/1992 | Walston | 33/264 |

Primary Examiner—Vincent P. McGraw
Assistant Examiner—K. P. Hantis
Attorney, Agent, or Firm—Henderson & Sturm

[57] ABSTRACT

A visual hitching alignment apparatus (10) to facilitate the coupling engagement between a towed vehicle (100) and a towing vehicle (200); wherein, the apparatus (10) comprises a sight unit (12) having an interior opening (44) and a pair of cross-hair elements (43) that are intended to intersect a target unit (11) attached to the towed vehicle (100), at a point when the target unit (11) fills the interior opening (44) when the two vehicles (100) (200) are aligned properly for the purposes of being hitched together.

4 Claims, 3 Drawing Sheets

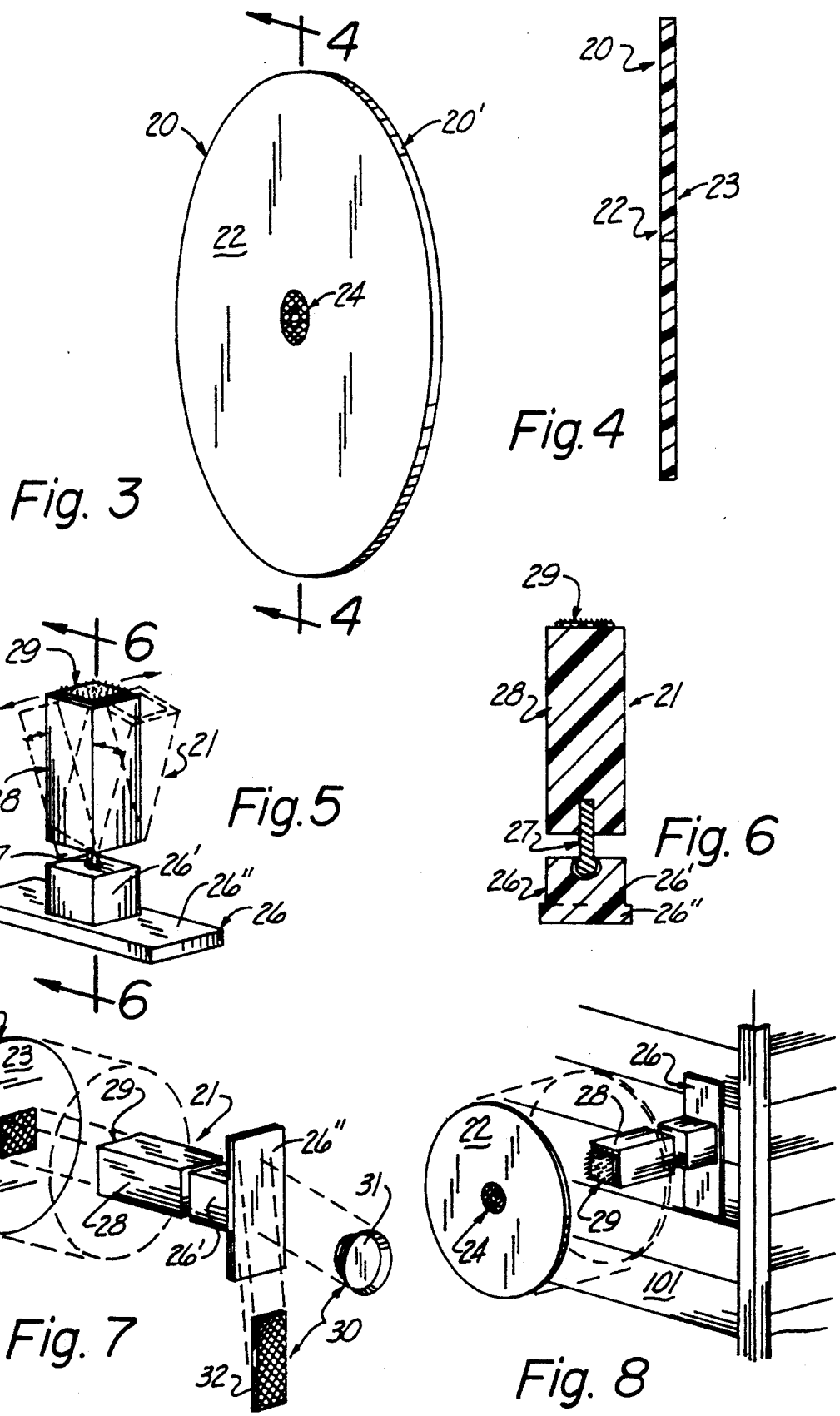

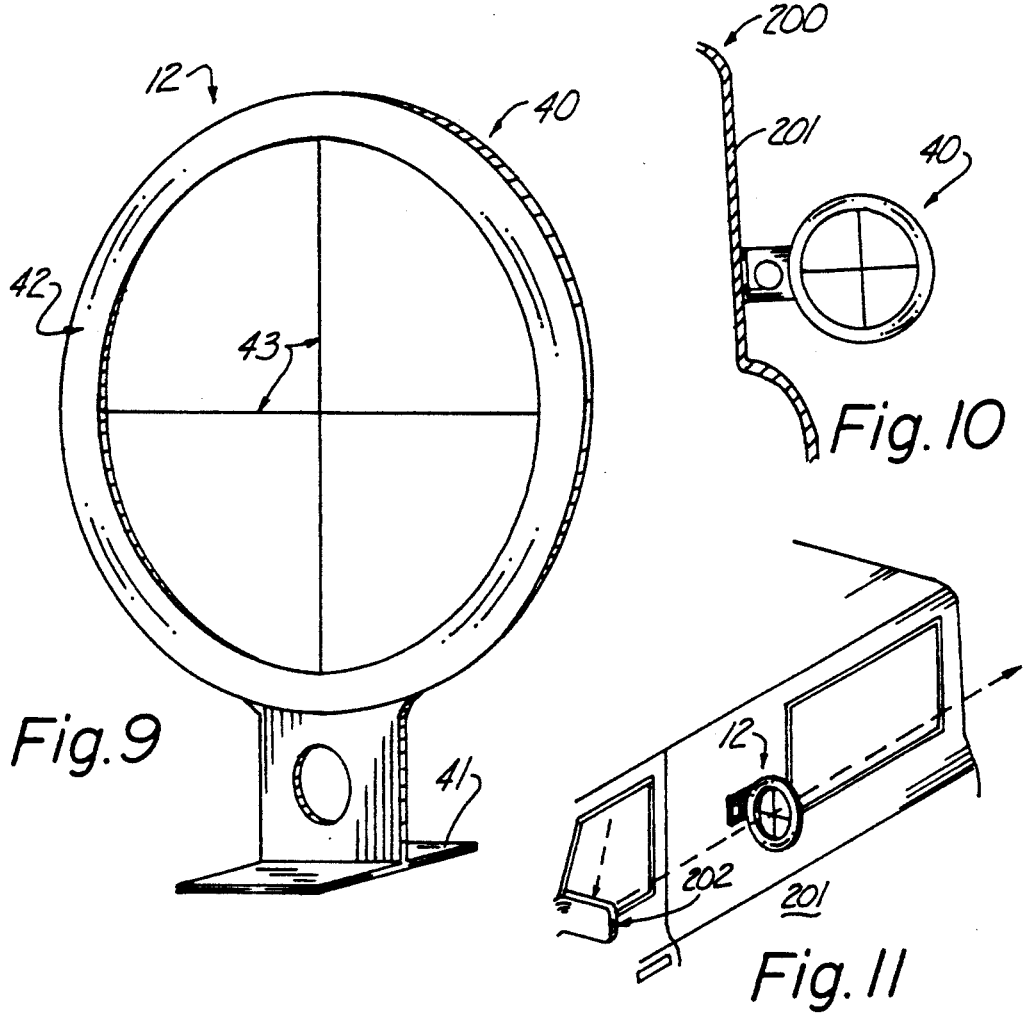
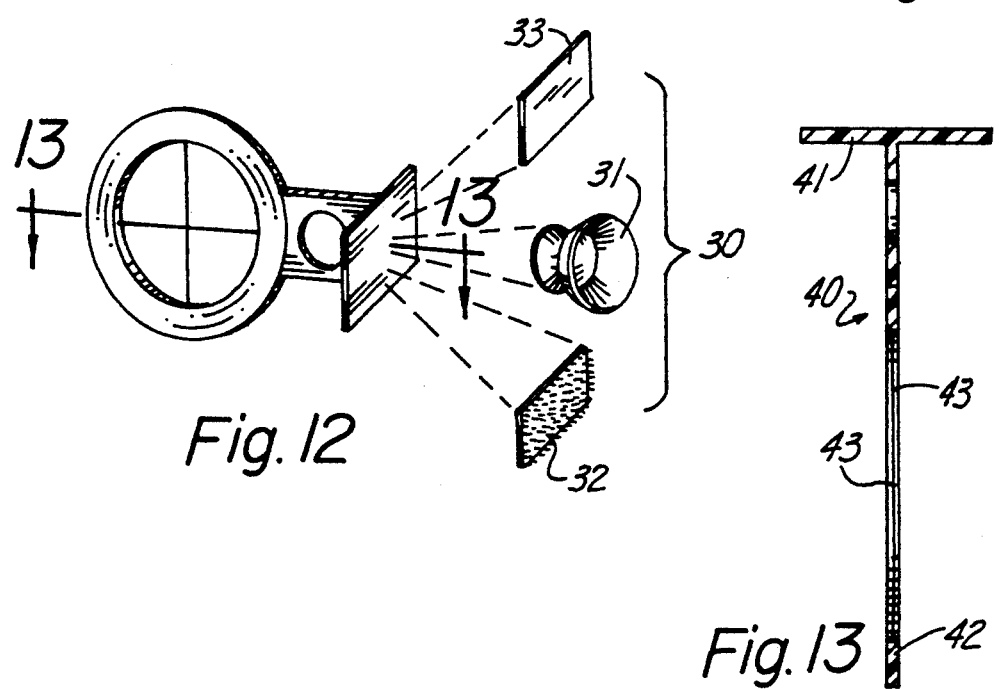

VISUAL HITCH ALIGNMENT APPARATUS

BACKGROUND ART

This invention was the subject matter of Document Disclosure Program Registration No. 284,205 which filed in the United States Patent and Trademark Office on Jun. 13, 1991.

As can be seen by reference to the following U.S. Pat. Nos. 4,813,758; 4,941,263; 4,257,706; and 4,687,220; the prior art is replete with myriad and diverse visual systems designed to assist a vehicle operator in a variety of vehicle maneuvers including parking, hitching, etc.

While all of the aforementioned prior art constructions are more than adequate for the basic purpose and function for which they have been specifically designed, these patented devices are neither particularly well suited nor designed to produce the specific purpose and function provided by the subject matter of the present invention.

As anyone who has experienced the difficulty of properly aligning a vehicle to a towed device can attest, the hitching process is normally a time consuming trial and error proceeding that virtually cries out for a new apparatus that can simplify the procedure.

As a consequence of the foregoing situation, there has existed a longstanding need among owners of trailed items such as boat trailers, campers, and the like, for a new type of a removable visual aid that can be installed on both the towing and trailed vehicle to facilitate the hitching connection between the vehicles; and, the provision of such a construction is a stated objective of the present invention.

DISCLOSURE OF THE INVENTION

Briefly stated, the hitching aid construction that forms the basis of the present invention comprises a target unit mounted on the trailed vehicle; and, a rifle type sight unit mounted on the towing vehicle; wherein, the towing vehicle operator aligns the cross-hairs of the sight unit with the center of the target unit by viewing both units through the drivers side exterior mirror to correctly align the two vehicles for the purpose of hitching the vehicles together; such that when the full circle of the target appears to fill inner circle of sight and the cross hairs of sight are on center spot of target, you have a perfect alignment.

As will be explained in greater detail further on in the specification, both the target and sight units are sturdily constructed to provide a long and useful life; and, are very simple to install on the respective vehicles to assure that the vehicles will be properly aligned for the purpose of engaging the hitching connection.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 3 is a perspective view of the target face;

FIG. 4 is a cross-sectional view of the target face taken through line 4—4 of FIG. 3;

FIG. 5 is an isolated perspective view of the mounting base of the target unit;

FIG. 6 is a cross-sectional view of the target base taken through line 6—6 of FIG. 5;

FIG. 7 is an exploded perspective view of the target unit;

FIG. 8 is a perspective view of the operative engagement of the target unit with the towed vehicle;

FIG. 9 is an isolated perspective view of the sight unit;

FIG. 10 is a side plan view of the sight unit mounted on the side of the towing vehicle;

FIG. 11 is a perspective view of the sight unit mounted on the towing vehicle;

FIG. 12 is a detail view showing alternate mounting arrangements for the sight unit; and, FIG. 13 is a top cross-sectional view of the sight unit taken through line 13—13 of FIG. 12.

BEST MODE FOR CARRYING OUT THE INVENTION

Figure 1:
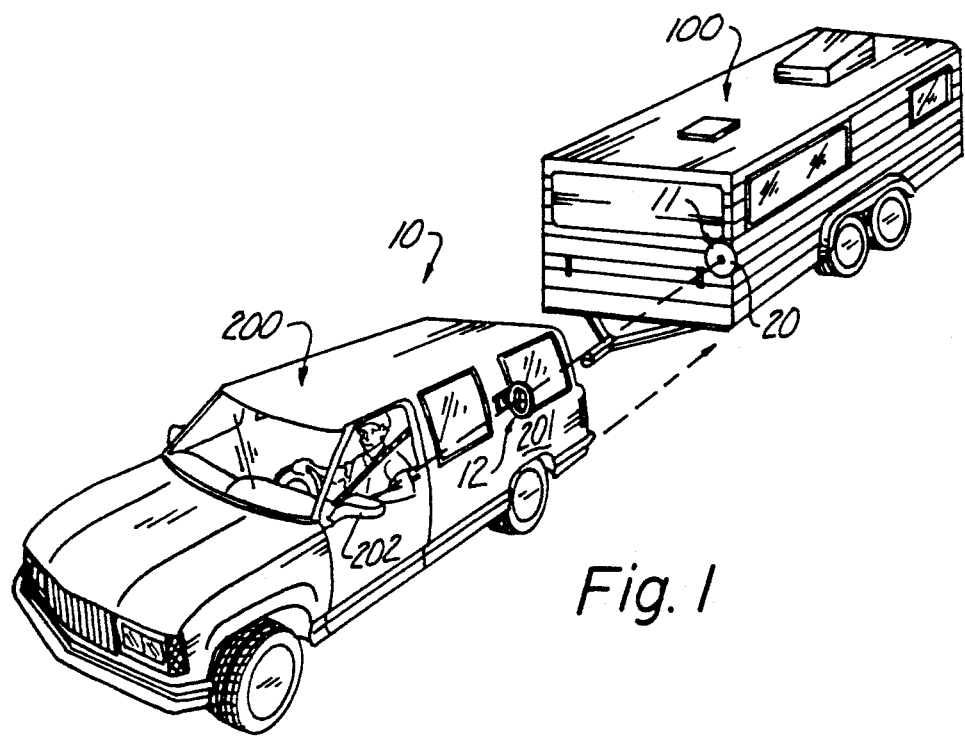
FIG. 1 is an overhead perspective view of the hitching aid of this invention being employed in its intended manner.
Figure 2:
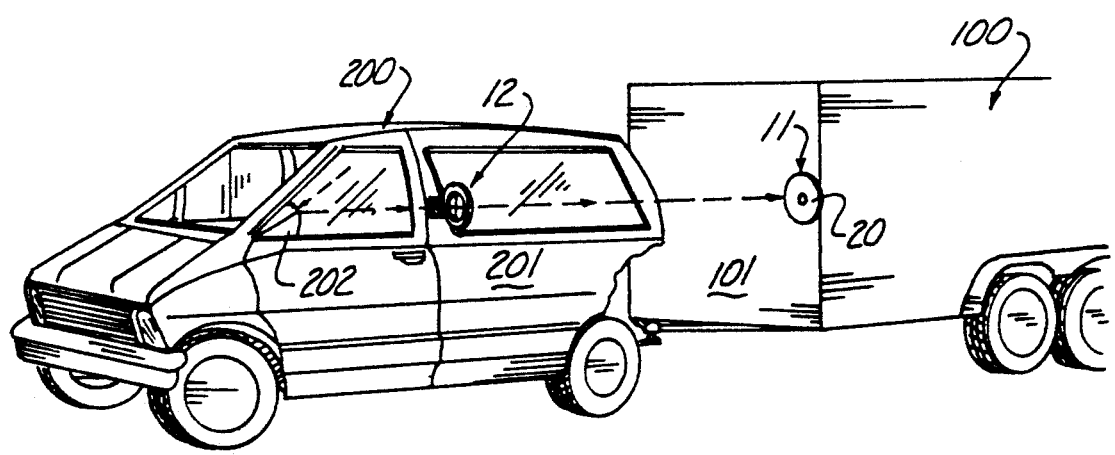
FIG. 2 is a ground level perspective view of the arrangement depicted in FIG. 1.

As can be seen by reference to the drawings, and in particular to FIGS. 1 and 2 the visual hitch alignment apparatus that forms the basis of the present invention is designated generally by the reference numeral (10). The apparatus (10) comprises in general a target unit (11) operatively associated with a towed vehicle (100) and a sight unit (12) operatively associated a with a towing vehicle (200). These units will now be described in seriatim fashion.

As can best be seen by reference to FIG. 7, the target unit (11) comprises a target member (20) and a target base member (21). As shown in FIGS. 3, 4, and 7, the target member (20) comprises a generally rigid thin flat target disk element (20') having a front face (22) and a rear face (23); wherein, the front face (22) is provided with a centrally bulls-eye indicia (24); and, wherein, the rear face (23) is provided with a releasable fastening element (25) whose purpose and function will be described presently.

Turning now to FIGS. 1 through 7 it can be seen that the target base member (21) comprises a generally T-shaped mounting plate element (26) whose stem (26') is operatively connected via a universal joint connector (27) to an elongated base extension element (28); which has a complimentary releasable fastening element (29) formed on its outboard end; wherein, the releasable fastening elements (25) (29) cooperate with one another in a well recognized fashion to operatively engage the target member (20) to the target base member (21).

As can best be appreciated by reference to FIGS. 7 and 8, the arms (26") of the T-shaped mounting plate element (26) are provided with fastening means (30) such as a suction cup element (31) or an adhesive strip (32) for securing the target unit (11) at a selected location on the front (101) of the towed vehicle (100). Furthermore, the universal joint connector (27) allows the target member (20) to be pivotally adjusted relative to both the base member (21) and the towed vehicle (100) for reasons that will become self-apparent further on in the specification.

Turning now to FIGS. 9 through 13, it can be seen that the sight unit (12) comprises an elongated sight member (40) having a generally elongated T-shaped cross-sectional configuration; wherein, the sight member (40) is provided with a mounting flange (41) on its inboard end and a sight ring (42) on its outboard end. In addition the sight ring (42) is disposed generally perpendicular to the mounting flange (41); and is further provided with both vertical and horizontal cross-hair elements (43), which intersect at the center of the open sight ring opening (44); wherein, the sight ring opening (44) is dimensioned to appear to completely surround the target disk element (20') when the vehicles are in proper alignment.

Furthermore as can be seen by reference to FIGS. 9, 10, 12 and 13 the stem of the T-shaped mounting flange (41) is provided with a discrete aperture (45) which is dimensioned to receive a small flashlight (50) shown in phantom in FIG. 9 to provide additional illumination of the target member (20) at night.

As can also be seen by reference to FIG. 12, the mounting flange (42) is further provided with fastening means (30) such as a suction cup (31), adhesive strip (32) or magnet (33) for operatively connecting the sight unit (12) to the side (201) of the towing vehicle (200).

As shown in FIGS. 1, 2 and 11, the hitch alignment apparatus (10) is intended to be installed on the towing vehicle (200) and the towed vehicle (100) in the following manner. First of all the installation of the apparatus must first take place when the vehicles (100) (200) are hitched together and aligned along a common axis.

Once this orientation between the vehicles (100) (200) has been established the target unit (11) is deployed on the drivers side portion of the face (101) of the towed vehicle (100) such that the target member (20) is clearly visible by the vehicle operator through the drivers side exterior mirror (202) of the towing vehicle (200). At this juncture the sight unit (12) is secured to the drivers side (201) of the towing vehicle (200) such that the entire target member (20) fills the the sight ring (42) and the cross-hair elements (43) intersect the bulls-eye indicia (24) on the target unit (11) as viewed by the vehicle operator through the drivers side exterior mirror (202).

Now when the operator wishes to reconnect the disengaged vehicles, all the driver has to do is to maneuver the towing vehicle (200) relative to the towed vehicle (100) to replicate the intersection of the cross-hair elements (43) with the bulls-eye indicia (24), and the entire target unit (20) with the sight ring (42).

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

I claim:

1. A visual hitching alignment apparatus to facilitate the coupling engagement between a towing vehicle and a towed vehicle having a front face; wherein, the apparatus comprises:
    a target unit comprising a generally thin flat target member operatively connected in a generally flush fashion to the drivers side of the front face of the towed vehicle at a location that is visible to the operator of the towing vehicle through the drivers side exterior mirror on the towing vehicle; and,
    a sight unit operatively connected to the drivers side of the towing vehicle at a point intermediate the drivers side exterior mirror on the towing vehicle and the target unit on the towed vehicle; wherein, the sight unit has a central opening and is provided with a pair of intersecting cross-hair elements that will visually intersect a selected portion of the target unit when the target unit visually fills the central opening in the sight unit at the point when said vehicles are properly aligned to allow a coupling engagement between the vehicles.

2. The apparatus as in claim 1; wherein, the target unit further comprises: a target base member having one end connected to the towed vehicle and having another end which is operatively associated with the target member.

3. The apparatus as in claim 2; wherein, the target base member further comprises:
    a mounting plate element connected on one end to the towed vehicle and having another end operatively associated with the target member via a universal joint connector, such that the target member may be adjusted relative to the target base member.

4. The apparatus as in claim 3; wherein, the target base member further comprises:
    a base extension element operatively engaged on one end to the target member, and operatively connected on the other end to the mounting plate element via said universal joint connector.

* * * * *